April 21, 1953 R. N. NEWMAN 2,635,917
ATTACHING MEANS FOR VEHICLE ROOF LINING
Filed Oct. 25, 1948
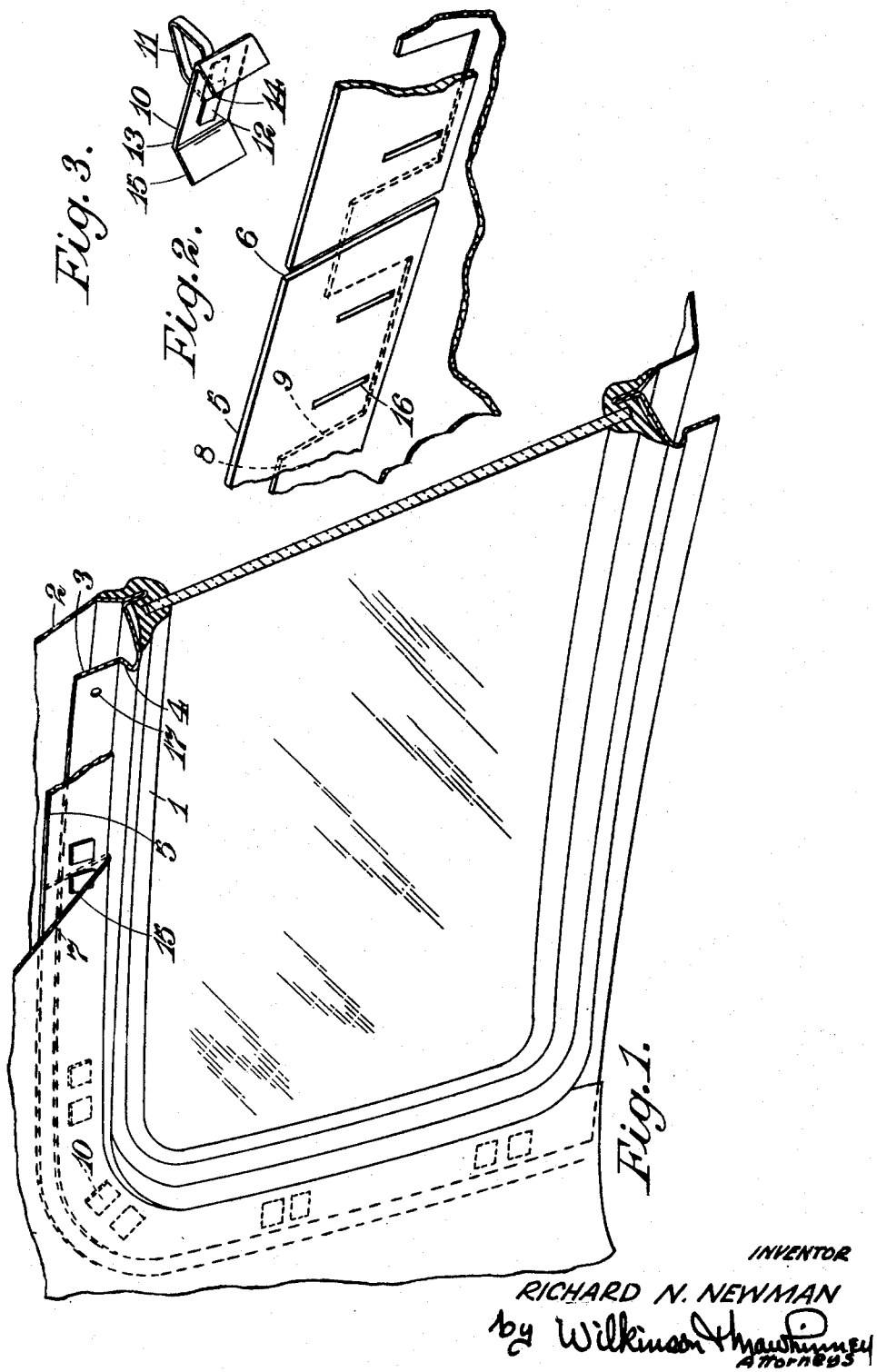
INVENTOR
RICHARD N. NEWMAN
by Wilkinson Mawhinney
ATTORNEYS

Patented Apr. 21, 1953

2,635,917

UNITED STATES PATENT OFFICE 2,635,917

ATTACHING MEANS FOR VEHICLE ROOF LINING

Richard Noel Newman, Coventry, England, assignor to Humber Limited, Coventry, England, a British company Application October 25, 1948, Serial No. 56,393
In Great Britain October 24, 1947

1 Claim. (Cl. 296—137)

(Granted under the provisions of sec. 14, act of March 2, 1927; 357 O. G. 5)

The invention relates to a method and means for lining the roof of a motor vehicle body with fabric, artificial leather, plastic or other flexible sheet material.

An object of the invention is to simplify the attachment of the lining and to provide a method and means of attachment suitable for mass production procedure.

The invention consists in the method of lining the roof of a motor vehicle body with fabric, artificial leather, plastic or other flexible sheet material which method comprises the steps of securing an edge portion of the material to an auxiliary frame member conforming to the shape desired for the edge of the finished lining and then attaching the auxiliary frame member to a support member of the body to hold the edge of the lining in the desired shape and position.

Preferably the auxiliary frame member is attached to the support member by spring-clips.

The auxiliary frame member may be of millboard, cardboard, or the like and the lining material may be secured to the auxiliary frame by adhesive. The arrangement is such that after attachment of the auxiliary frame to the supporting frame the material is folded back over the auxiliary frame to cover the frame and the fastening means.

A specific example of the invention as applied to the fabric head lining or roof-trim for the roof of a pressed steel four-seater motor body will now be described with reference to the accompanying drawings in which:

Figure 1 is a perspective view, partly broken away, of the backlight of the body;

Figure 2 is a view showing one stage in the attachment of the fabric to the auxiliary frame, and Figure 3 shows a spring-clip employed to secure the frame to the body.

In the examples shown in Figures 1-3, the backlight frame 1 is formed by pressing from the sheet steel of the body and there is provided on the inside of the roof panel 2 and spaced therefrom a flange 3—constituting the support member—directed away from the backlight aperture and at a small angle towards the panel. At the root of the flange there is a step 4 directed inwardly to the body and serving as a locating frame for the edge of the head-lining.

The auxiliary frame 5 is constructed of millboard and conforms in size and shape with the aforesaid flange around the top and sides of the backlight. The auxiliary frame is, for ease in assembly divided into two parts as shown at 6 at a position on the centre line of the vehicle. In an alternative arrangement to be employed when the design of the body allows, the frame passes completely round the backlight. The auxiliary frame is provided at intervals with springclips as later described.

The lining material 7 is cut to conform with the shape of the step 4 with an allowance 8 equivalent to the width of the auxiliary frame, which allowance is turned back and secured by adhesive to the rear face of the auxiliary frame, i. e. the face which lies against the flange 3 in the final assembly. To facilitate the attachment of the material to the auxiliary frame the material is cut away, as indicated at 9, to clear the spring-clips.

The spring-clips, indicated at 10, as constructed, as shown in Figure 3, by bending strip material into the form of a hollow arrow-head 11 with a short shank terminating in outwardly directed flanges 12. The clips are secured to the auxiliary frame member by anchor plates 13 of which each is in the form of a short channel of soft sheet material having in its base a slot 14 through which the clip is passed and which embraces the shank thereof. The sides 15 of the channel are passed through slits 16 in the auxiliary frame and are bent over to retain the anchor plate in position with the flanges of its clip clamped between the base of the channel and the auxiliary frame. To secure the auxiliary frame in position around the backlight the arrowhead portions of the spring-clips are pressed into holes 17 formed in the flange 3 and retain the auxiliary frame in position by engagement of the edges of the holes in the step portions of the arrow-heads.

A swinging hoop or listrail is employed to tighten the roof lining after attachment to the backlight as just described. The hoop is pivoted to the body at its ends and after the material has been secured to the hoop the latter is moved away from the backlight to tension the material between the hoop and the backlight and is then secured to the body, for example by spot welding.

I claim:

A motor vehicle body having a roof of stiff sheet material, a lining of flexible sheet material therefor, a backlight in an opening in the back of the roof, a frame around the backlight opening consisting of an inwardly directed flange formed of the rigid sheet material, means for securing the backlight within the frame and a concealed arrangement for locating and securing the lining around the backlight consisting of a lip of the rigid sheet material extending outwardly from the flange of the backlight frame within the body and, around at least a part of the frame, an auxiliary frame of sheet material shaped to provide an inner edge conforming with and fitting around at least a part of the backlight frame, and means securing the auxiliary frame to the lip aforesaid in face-to-face relation with the inner face of the lip, the head-lining forming a facing for the inner surface of the auxiliary frame concealing the frame and securing means and an edge portion of the head-lining passing around the said inner edge of the auxiliary frame and being secured to the back of the auxiliary frame between the auxiliary frame and the lip independently of the aforesaid means securing the auxiliary frame to the lip.

RICHARD NOEL NEWMAN.

References Cited in the file of this patent

UNITED STATES PATENTS

| Number | Name | Date |
|---|---|---|
| 882,232 | Burg | Mar. 17, 1908 |
| 884,948 | Orr | Apr. 14, 1908 |
| 1,638,284 | Bossemeyer | Aug. 9, 1927 |
| 1,672,207 | Geyer | June 5, 1928 |
| 1,842,283 | Place | Jan. 19, 1932 |
| 1,967,357 | Fry | July 24, 1934 |
| 2,023,188 | Abbot | Dec. 3, 1935 |
| 2,051,191 | Watson | Aug. 18, 1936 |
| 2,055,427 | Churchill | Sept. 22, 1936 |
| 2,099,134 | Nissley et al. | Nov. 16, 1937 |
| 2,118,563 | Mackay | May 24, 1938 |
| 2,146,438 | Olson | Feb. 7, 1939 |
| 2,247,457 | Widman | July 1, 1941 |
| 2,390,193 | Tandetzke | Dec. 4, 1945 |